Figure 1:
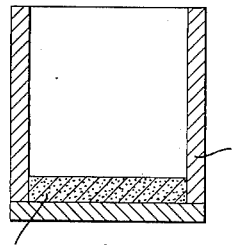

Dec. 18, 1951  W. S. RAMSAY  2,579,050
ENAMELING OF CONCRETE MATERIALS
Filed June 7, 1948  2 SHEETS—SHEET 1

INVENTOR.
William S. Ramsay
BY
ATTORNEYS

Dec. 18, 1951  W. S. RAMSAY  2,579,050
ENAMELING OF CONCRETE MATERIALS
Filed June 7, 1948  2 SHEETS—SHEET 2

INVENTOR.
William S. Ramsay
BY
ATTORNEYS

Patented Dec. 18, 1951

2,579,050

UNITED STATES PATENT OFFICE 2,579,050

ENAMELING OF CONCRETE MATERIALS

William S. Ramsay, Canton, Ohio, assignor, by mesne assignments, to Stark Ceramics, Inc., Canton, Ohio, a corporation of Ohio Application June 7, 1948, Serial No. 31,491

9 Claims. (Cl. 25—154)

The invention relates to a method of enameling concrete articles and more particularly to the application of a layer or coating of fused porcelain enamel or fritted glaze onto the surface of concrete articles which are incapable, without deterioration, of withstanding the temperatures at which the enamel is fused.

It is well known that concrete articles which are formed of or contain Portland cement, attain their maximum strength by curing for a definite period of time after they have been cast or molded, and that such articles lose a considerable part of their strength when subjected to high temperatures for even a short period of time.

For this reason, although attempts have been made to apply a coating of fused porcelain enamel to the surface of articles formed of or containing Portland cement, no satisfactory method has been produced for enameling articles formed of such material, since concrete blocks and the like which have been coated with a porcelain enamel under existing methods have become so weakened that they are entirely unsatisfactory for the purposes for which they are intended.

There is a large field of usefulness of porcelain enamel as a decorative and protective finish on articles formed of or containing considerable amounts of Portland cement, and which for the above reasons may not be subjected to the high temperatures necessary in enameling processes.

Examples of such articles are concrete building blocks, concrete asbestos shingles and similar structural materials which because of their nature and use cannot be coated with fused porcelain enamel under present methods, since they may not be subjected to elevated temperatures such as those required for fusing of the enamel without impairing their mechanical strength.

Calcium aluminate cement mixed with a refractory aggregate, when heated to the temperature required for fusing vitreous enamel, will form a ceramic bond as it loses the hydraulic bond due to the high temperature. It has therefore been found that by applying a layer of calcium aluminate cement and refractory aggregate to a surface of Portland cement, the same may be glazed with a vitreous enamel.

It is therefore an object of the present invention to provide a method of forming a fused porcelain enamel coating upon articles formed of or containing Portland cement in such a manner that, while the porcelain enamel is properly fused, the body of the structural element is not subjected to destructive temperatures which will impair the strength thereof.

Another object is to provide a method of coating an article formed of or containing Portland cement with a coating of fused porcelain enamel which consists in forming a relatively thin layer of calcium aluminate cement and a refractory aggregate upon the exterior of the Portland cement article and then fusing a layer of porcelain enamel upon the surface of the calcium aluminate cement layer, while maintaining the body of the Portland cement article at a sufficient low temperature to prevent damage thereto.

A further object is to provide such a method which consists in first placing a relatively thin layer of calcium aluminate cement and refractory aggregate in one side of a mold, then filling the mold with Portland cement and sand and gravel, or other aggregate, curing the cast or molded article, then spraying, dusting, dipping or otherwise applying a coating of porcelain enamel upon the calcium aluminate cement surface, and then subjecting said surface to sufficient temperature to fuse the enamel, while maintaining the body of the Portland cement article at a temperature at which the strength thereof will not be impaired.

A still further object is to provide such a method which consists in first forming a relatively thin slab of calcium aluminate cement and refractory aggregate, having tie wires, dovetailed ribs and grooves, or other means upon one surface for attaching it to a concrete article, then placing said slab in one side of a mold and casting or molding a block or other article of Portland cement and aggregate therein, curing said concrete article and applying a fused porcelain enamel coating upon the surface of the calcium aluminate cement in the manner above referred to.

The invention further contemplates the coating of articles formed entirely of calcium aluminate cement and refractory aggregate with fused porcelain enamel.

Figure 2:
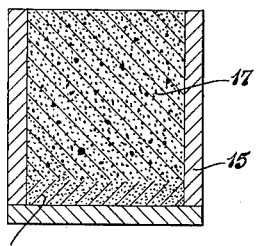
Figure 3:
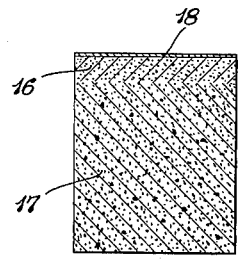
Figure 4:
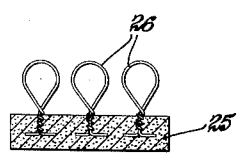
Figure 5:
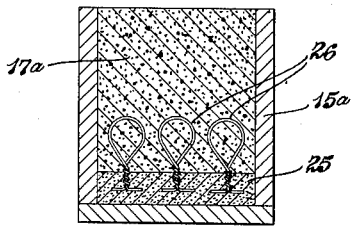
Figure 6:
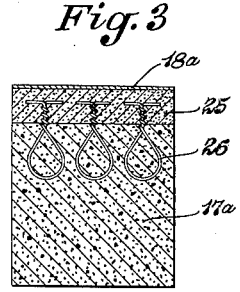
Figure 7:
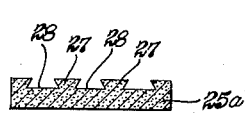
Figure 8:
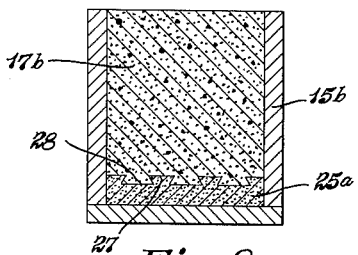
Figure 9:
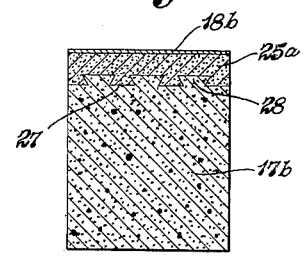
Figure 10:
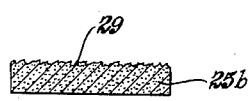
Figure 11:
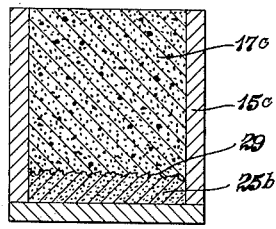
Figure 12:
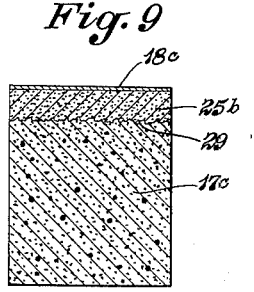
Figure 14:
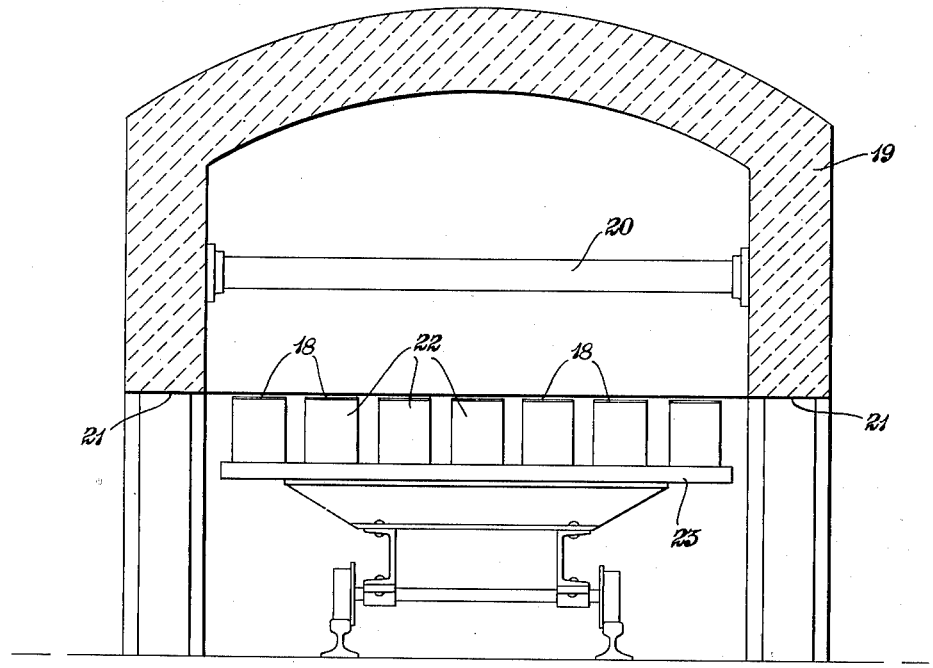
Figure 13:
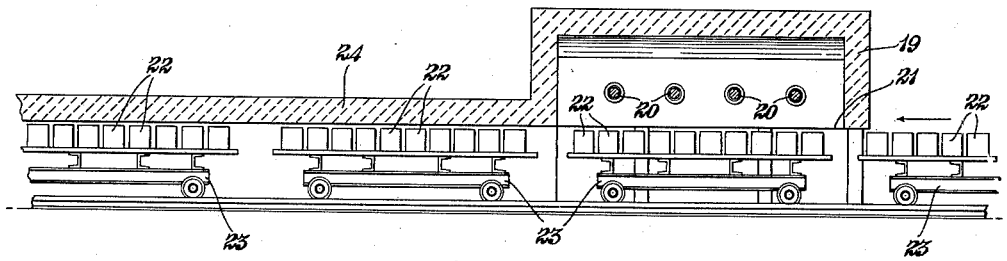

The above objects, together with others which will be apparent from the drawings and following description, or which may be later referred to, may be attained by carrying out the invention in the manner hereinafter described in detail, reference being had to the accompanying drawings, in which:

Figure 1 is a vertical sectional view of a mold for forming a concrete block or the like, showing a relatively thin layer of calcium aluminate cement and refractory aggregate located in the bottom of the mold;

Fig. 2 a similar view showing the remainder of the mold filled with Portland cement and aggregate, to cast or mold a block or the like;

Fig. 3 a vertical, sectional view of the composite block formed by this method, showing the same inverted with a coating of porcelain enamel applied to the outer surface of the calcium aluminate cement, after the article has been cured;

Fig. 4 a vertical sectional view through a relatively thin slab of calcium aluminate cement and refractory aggregate, with tie wires molded therein;

Fig. 5 a vertical, sectional view of a mold with the slab shown in Fig. 4 located in one side of the mold, the remainder of the mold being filled with Portland cement and aggregate to form a concrete block to one surface of which the calcium aluminate cement slab is bonded;

Fig. 6 an inverted, sectional view of the composite block thus formed, after curing, with a coating of porcelain enamel applied to the surface of the calcium aluminate cement slab;

Fig. 7 a vertical, sectional view through a slab of calcium aluminate cement and refractory aggregate, having dovetail grooves and ribs in one surface;

Fig. 8 a vertical, sectional view of a mold with the slab of Fig. 7 located in one side thereof, showing the manner of bonding the same to a block of Portland cement and aggregate;

Fig. 9 an inverted, vertical section of the block formed in Fig. 8, after the same is cured and with a coating of porcelain enamel applied to the surface of the calcium aluminate cement slab;

Fig. 10 a vertical, sectional view through a slab of calcium aluminate cement and refractory aggregate having one side roughened to form an anchorage;

Fig. 11 a vertical, sectional view through a mold in which the slab shown in Fig. 10 is located in one side of the mold, and a block of Portland cement and aggregate bonded to the roughened side thereof;

Fig. 12 an inverted, sectional view of the block formed in Fig. 11, after the same has been cured and a coating of porcelain enamel applied to the calcium aluminate cement surface thereof;

Fig. 13 a longitudinal sectional view through a tunnel kiln in which the enamel coating may be fused; and Fig. 14 an enlarged transverse sectional view through the heating chamber of the furnace shown in Fig. 13.

In carrying out the invention any conventional mold, such as is ordinarily used in casting or molding concrete articles, is indicated at 15 and as shown in Fig. 1, a thin layer of calcium aluminate cement and refractory agggregate, such as a burned clay aggregate, which may be in the proportions of about one part of cement to 5 or 6 parts of aggregate, is first placed in the bottom of the mold, as indicated at 16 in Fig. 1, this layer being relatively thin, and in practice being about one-fourth inch or less.

Then, as shown in Fig. 2, the mold is filled with a mixture of Portland cement and aggregate, such as cement and gravel or the like as indicated at 17, which mixture may be in the proportions of about one part of Portland cement to seven parts of aggregate.

After the composite article thus formed has sufficiently hardened to remove it from the mold, it may be cured in conventional manner, after which a coating of any well known porcelain enamel or fritted glaze may be sprayed, dusted or otherwise applied to the calcium aluminate cement surface of the article, as indicated at 18 in Fig. 3.

Without in any manner limiting the invention, but merely by way of illustration, an example of an enamel suitable for the purpose is given below:

| | |
|---|---|
| Silicon dioxide | 32.3 |
| Aluminum oxide | 2.4 |
| Potassium oxide | 3.7 |
| Zinc oxide | 11.4 |
| Calcium oxide | 5.6 |
| Barium oxide | 5.7 |
| Boric oxide | 7.2 |
| Lead oxide | 14.7 |
| Zirconium oxide | 14.9 |
| Lithium oxide | .5 |

The above, or any other well known porcelain enamel or fritted glaze, may be mixed with sufficient water so that it may be sprayed, or if desired it may be dusted on the surface in dry condition.

The enameled surface of the composite block or other article is then fired to fuse the enamel, this firing being carried out by submitting the calcium aluminate cement surface only of the article to the extreme temperature required for fusing the enamel, while the Portland cement portion of the article is maintained at a temperature which will not detrimentally affect the mechanical or structural properties thereof.

The burning may be accomplished by submitting the enameled surface of the article to a temperature of about 1950° F. to 2100° F. for a period of two minutes to one-half minute, or at a lower temperature for a longer time, or a higher temperature for a shorter time, in order to fuse the enamel.

At such temperatures as are necessary to fuse the enamel, the calcium aluminate cement will form a bond upon the Portland cement article, which provides a suitable surface to which the fused enameled coating will adhere.

In order to carry out the firing of the enameled surfaces of the articles, while maintaining the Portland cement bodies of the articles below the temperature at which the mechanical and structural properties thereof will be detrimentally affected, a kiln such as shown in Figs. 13 and 14 may be used.

This kiln comprises generally a heating chamber 19, which may be provided with suitable heating means, such as the electric resistor elements 20, the bottom of the heating chamber being open as indicated at 21

The composite concrete articles, indicated generally at 22 in Figs. 13 and 14, are passed through the kiln upon cars indicated generally at 23, a conveyor or the like, in such position that only the glazed upper surfaces 18 thereof will be submitted to the extreme temperature of the heating chamber, the remainder of each article 22 being located below the open bottom 21 of the heating chamber, as shown in Fig. 13, so that they are not subjected to the extreme temperature of the kiln and will remain sufficiently cool so that the Portland cement bodies of the articles will not be weakened.

Beyond the heating chamber 19 the articles may pass through a cooling tunnel 24, in which they are slowly cooled down to a temperature at which they may be safely discharged from the kiln.

Another method of forming the composite articles is shown in Figs. 4 to 6. A thin slab 25, of calcium aluminate cement and refractory aggregate, may first be formed as shown in Fig. 4, and wire ties or the like, as indicated at 26, may be molded therein.

This slab is cured in any manner and may then be coated with any desired vitreous enamel and fired to fuse the enamel coating on the surface. The slab 25 may then be placed in a mold 15a, as shown in Fig. 5, and the mold filled with Portland cement and aggregate, as indicated at 17a, the ties 26 forming anchors to bond the thin calcium aluminate cement slab 25 to the Portland cement body. After the Portland cement body has been cured the article is ready for use.

Or, if desired, the slab 25 may be cured and then placed in one side of the mold 15a, as shown in Fig. 5, and the mold is filled with a mixture of Portland cement and aggregate as indicated at 17a, the ties 26 forming anchors to bond the thin calcium aluminate cement slab 25 to the body of the Portland cement article.

When the Portland cement body has sufficiently hardened the composite article may be removed from the mold and cured in conventional manner, after which a coating 18a of any suitable enamel is applied thereto and the article may then be fired in the manner above described.

Another method in which the article may be formed is shown in Figs. 7 to 9. First, a thin slab 25a, of calcium aluminate cement and refractory aggregate, is formed as shown in Fig. 7, with alternate dovetail ribs and grooves 27 and 28 in one surface thereof.

This slab is cured and then glazed and fired as above described, or after curing may be placed in one side of a mold 15b, as shown in Fig. 8, and the mold is filled with a mixture of Portland cement and aggregate, as indicated at 17b, the alternate dovetail ribs and grooves providing anchorage between the calcium aluminate cement slab and the Portland cement body of the article.

When the Portland cement has sufficiently hardened this composite article may be removed from the mold and cured, after which a coating 18b of any suitable enamel is applied to the calcium aluminate cement surface of the article and it is then fired as above described.

In Figs. 10 to 12 is shown another method of making this composite block. As shown in Fig. 10 a slab 25b, of calcium aluminate cement and refractory aggregate, is formed with one side roughened as indicated at 29.

This thin slab is cured and then glazed and fired, or after curing may be placed in one side of a mold, as indicated at 15c, and the mold is filled with a mixture of Portland cement and aggregate, as indicated at 17c, and when the same is sufficiently hardened the article may be removed from the mold. A bond will be produced between the Portland cement and the calcium aluminate cement by means of the roughened surface 29.

When this composite article has been cured, a coating of enamel, as indicated at 18c, is placed upon the calcium aluminate cement surface thereof and the article is fired as above described.

It should be understood that if desired, an entire block, or other article such as the slabs above described, may be formed of calcium aluminate cement, and enameled and fired in the manner described above.

The method of the present invention produces a finished article characterized by the fact that the fired surface layer of enamel is securely bonded to the calcium aluminate cement surface of the article which forms a ceramic bond as it loses its hydraulic bond, while the Portland cement body of the article is not impaired by the fusing of the enamel.

I claim:

1. The method of vitreous enameling concrete articles which consists in forming a concrete article having a body of Portland cement and aggregate with a relatively thin calcium aluminate cement and refractory aggregate surface thereon, curing the concrete article, applying a coat of vitreous enamel to said calcium aluminate cement surface, and subjecting the enameled surface only to sufficient temperature for a sufficient period of time only to fuse the enamel while maintaining the Portland cement body of the article below a temperature at which the mechanical and structural properties of the concrete would be damaged.

2. The method of vitreous enameling concrete articles which consists in forming a concrete article having a body containing Portland cement with a relatively thin calcium aluminate cement surface thereon, curing the concrete article, applying a coat of vitreous enamel to said calcium aluminate cement surface, and subjecting the enameled surface only to sufficient temperature for a sufficient period of time only to fuse the enamel while maintaining the Portland cement body of the article below a temperature at which the mechanical and structural properties of the concrete would be damaged.

3. The method of vitreous enameling concrete articles which consists in forming a concrete article having a body of Portland cement and aggregate and a thin layer of calcium aluminate cement and refractory aggregate on one side thereof, curing the article, applying a coat of vitreous enamel to the surface of said one side of the article, and subjecting said enameled surface only to sufficient temperature for a sufficient period of time only to fuse the enamel while maintaining the Portland cement body of the article below a temperature at which the mechanical and structural properties of the concrete would be damaged.

4. The method of vitreous enameling concrete articles which consists in forming a thin slab of calcium aluminate cement and refractory aggregate having anchoring means on one side thereof, curing said slab, casting a body of Portland cement and aggregate upon said one side of the slab and anchored thereto, curing said body, applying a coat of vitreous enamel to the outer surface of said slab, and subjecting said enameled surface only to sufficient temperature for a sufficient period of time only to fuse the enamel while maintaining the Portland cement body of the article below a temperature at which the mechanical and structural properties of the concrete would be damaged.

5. The method of vitreous enameling concrete articles which consists in forming a concrete article having a body of Portland cement and aggregate and a thin layer of calcium aluminate cement and refractory aggregate on one side thereof, curing the article, applying a coat of vitreous enamel to the surface of said one side of the article, and subjecting said enameled surface only to a temperature of about 1950° F. to 2100° F. for about one-half minute to two minutes while maintaining the Portland cement body of the article below a temperature at which the mechanical and structural properties of the concrete would be damaged.

6. The method of vitreous enameling concrete articles which consists in forming a thin slab of calcium aluminate cement and refractory aggregate having anchoring means on one side thereof, curing said slab, casting a body of Portland cement and aggregate upon said one side of the slab and anchored thereto, curing said body, applying a coat of vitreous enamel to the outer surface of said slab, and subjecting said enameled surface only to a temperature of about 1950° F. to 2100° F. for about one-half minute to two minutes while maintaining the Portland cement body of the article below a temperature at which the mechanical and structural properties of the concrete would be damaged.

7. The method of vitreous enameling concrete articles which consists in forming a thin slab of calcium aluminate cement and refractory aggregate having ties on one side thereof, curing said slab, casting a body of Portland cement and aggregate upon said one side of the slab and anchored thereto, curing said body, applying a coat of vitreous enamel to the outer surface of said slab, and subjecting said enameled surface only to sufficient temperature for a sufficient period of time only to fuse the enamel while maintaining the Portland cement body of the article below a temperature at which the mechanical and structural properties of the concrete would be damaged.

8. The method of vitreous enameling concrete articles which consists in forming a thin slab of calcium aluminate cement and refractory aggregate having dovetail ribs and grooves on one side thereof, curing said slab, casting a body of Portland cement and aggregate upon said one side of the slab and anchored thereto, curing said body, applying a coat of vitreous enamel to the outer surface of said slab, and subjecting said enameled surface only to sufficient temperature for a sufficient period of time only to fuse the enamel while maintaining the Portland cement body of the article below a temperature at which the mechanical and structural properties of the concrete would be damaged.

9. The method of vitreous enameling concrete articles which consists in forming a thin slab of calcium aluminate cement and refractory aggregate having a roughened surface on one side thereof, curing said slab, casting a body of Portland cement and aggregate upon said one side of the slab and anchored thereto, curing said body, applying a coat of vitreous enamel to the outer surface of said slab, and subjecting said enameled surface only to sufficient temperature for a sufficient period of time only to fuse the enamel while maintaining the Portland cement body of the article below a temperature at which the mechanical and structural properties of the concrete would be damaged.

WILLIAM S. RAMSAY.

REFERENCES CITED

The following references are of record in the file of this patent:

UNITED STATES PATENTS

| Number | Name | Date |
|---|---|---|
| 723,279 | Jaques | Mar. 24, 1903 |
| 772,247 | Muller | Oct. 11, 1904 |
| 850,670 | McClenahan | Apr. 16, 1907 |
| 1,045,587 | Morley | Nov. 26, 1912 |
| 1,439,410 | Gray | Dec. 19, 1922 |
| 1,521,233 | Davidsen | Dec. 30, 1924 |
| 2,259,935 | Johnson | Oct. 21, 1941 |

FOREIGN PATENTS

| Number | Country | Date |
|---|---|---|
| 415,163 | Germany | June 15, 1925 |